(No Model.)

D. J. & J. E. KANE.
MACHINE FOR MOLDING BOOK BACKS.

No. 280,380. Patented July 3, 1883.

Witnesses
C. R. Gardner
A. C. Fuller

Inventors
Dennis J. Kane
James E. Kane

UNITED STATES PATENT OFFICE.

DENNIS J. KANE AND JAMES E. KANE, OF NEW BEDFORD, MASSACHUSETTS.

MACHINE FOR MOLDING BOOK-BACKS.

SPECIFICATION forming part of Letters Patent No. 280,380, dated July 3, 1883.

Application filed January 24, 1883. (No model.)

*To all whom it may concern:*

Be it known that we, DENNIS J. KANE and JAMES E. KANE, citizens of the United States, residing at New Bedford, in the county of Bristol and State of Massachusetts, have invented a new and useful Improvement in Machines for Molding Book-Backs, of which the following is a specification.

The object of our invention is to provide a device by means of which book-backs can be easily and quickly molded of various sizes, and in such a manner that they retain their shape after long use. We attain this object by the device illustrated in the accompanying drawings, in which—

Figure 1:
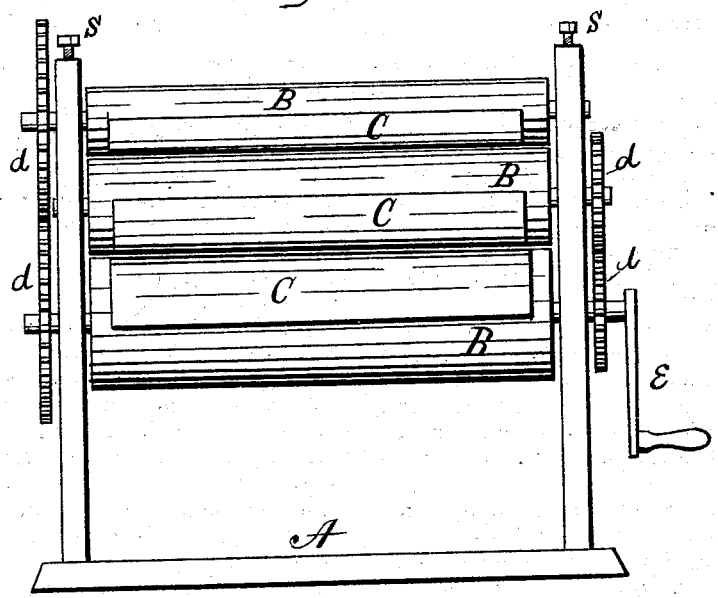
Figure 2:
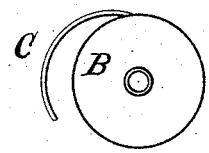

Figure 1 is a side elevation of the machine. Fig. 2 is an end view of one of the rolls.

In Fig. 1 the rolls B B B have their bearings in the standard of the frame A. The two upper rolls rest in boxes which have a vertical movement in said standard. The two upper rolls are adjusted to the lower roll by means of the set-screws s s. The rolls B B B are geared together by the gears d d d d, and receive motion by means of the crank e. To each of the rolls B B B is attached by one edge an apron, C, composed of thin sheet metal or other suitable material, as is fully shown in Fig. 2. The rolls B B B are made hollow, in order that they may be heated by steam, gas, or other convenient means.

The operation of the machine is as follows: The rolls being heated, pieces of pasteboard of the required size, after being wet, are placed between the heated rolls and the apron C. The crank e is then revolved a sufficient distance, so that the pasteboard shall be completely wrapped in between the apron and the roll, where it is left to dry. When the pieces of pasteboard are dry, the crank e is again revolved sufficiently to enable the pieces to be removed, when they are found to have assumed the exact shape desired, and are ready for use in binding books.

It will be observed that the rolls B B B are of different sizes. This is for the purpose of forming backs of different sizes.

We do not limit ourselves to the number of rolls shown in the drawings, as it is obvious that any desired number can be used in the same way.

Having thus described our invention, what we claim as new, and desire to secure by Letters Patent, is—

1. A machine for molding book-backs, combining in its structure a series of rolls geared to rotate together, and a series of aprons, each having one edge secured, respectively, to the peripheries of the rolls and moving therewith, in the manner and for the purpose described.

2. The combination, in a machine for molding book-backs, of a series of rolls of varying diameter, geared to revolve together, with a series of aprons attached at one edge, respectively, to the peripheries of the rolls and rotating therewith, in the manner and for the purpose described.

DENNIS J. KANE.
JAMES E. KANE.

Witnesses:
THOS. M. JAMES,
B. P. BATCHELOR.